United States Patent
Ina (10) Patent No.: US 12,213,176 B2
(45) Date of Patent: Jan. 28, 2025

(54) COMMUNICATION APPARATUS, COMMUNICATION METHOD, AND NON-TRANSITORY COMPUTER-READABLE STORAGE MEDIUM

(71) Applicant: CANON KABUSHIKI KAISHA, Tokyo (JP)

(72) Inventor: Eigoro Ina, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 412 days.

(21) Appl. No.: 17/848,431

(22) Filed: Jun. 24, 2022

(65) Prior Publication Data
US 2023/0008481 A1    Jan. 12, 2023

(30) Foreign Application Priority Data
Jul. 7, 2021    (JP) .................. 2021-113137

(51) Int. Cl.
*H04W 74/0816* (2024.01)
*H04W 72/0453* (2023.01)
*H04W 74/08* (2024.01)
*H04W 84/12* (2009.01)

(52) U.S. Cl.
CPC ... *H04W 74/0816* (2013.01); *H04W 72/0453* (2013.01); *H04W 74/0866* (2013.01); *H04W 84/12* (2013.01)

(58) Field of Classification Search
CPC ......... H04W 74/0816; H04W 72/0453; H04W 74/0866; H04W 84/12
See application file for complete search history.

(56) References Cited

U.S. PATENT DOCUMENTS

| | | | |
|---|---|---|---|
| 2021/0219236 A1* | 7/2021 | Ina | H04W 52/0229 |
| 2021/0385111 A1* | 12/2021 | Ina | H04L 25/03006 |
| 2022/0330088 A1* | 10/2022 | Ina | H04L 1/1848 |

FOREIGN PATENT DOCUMENTS

JP    2014-195303 A    10/2014

* cited by examiner

*Primary Examiner* — Hermon Asres
(74) *Attorney, Agent, or Firm* — Carter, DeLuca & Farrell LLP (57) ABSTRACT

A communication apparatus of a wireless LAN complying with the IEEE802.11 standard series determines, by executing CCA, whether a signal can be transmitted in a frequency channel to be used, transmits RTS in response to determination that the signal can be transmitted in the frequency channel, transmits data to a partner apparatus in a case where CTS is received from the partner apparatus in response to the RTS, and controls to use, in a case where the RTS is transmitted during a predetermined period after the communication apparatus shifts from a first state in which a signal cannot be received to a second state in which a signal can be received in the frequency channel, second transmission power lower than first transmission power used in a case where the RTS is transmitted during a period different from the predetermined period.

13 Claims, 8 Drawing Sheets

COMMUNICATION APPARATUS, COMMUNICATION METHOD, AND NON-TRANSITORY COMPUTER-READABLE STORAGE MEDIUM

BACKGROUND OF THE INVENTION

Field of the Invention

The present invention relates to an efficient wireless communication control technique taking interference into consideration.

Description of the Related Art

The Institute of Electrical and Electronic Engineers (IEEE) defines the IEEE802.11 standard series as communication standards of a wireless LAN. Note that the LAN indicates a local area network. The IEEE802.11 standard series includes IEEE802, 11a/b/g/n/ac/ax standards. To further improve the throughput and the frequency use efficiency, the IEEE has defined an IEEE802.11 be standard as anew standard of the IEEE802.11 series. In the IEEE802.11 be standard, the adoption of multi-link communication in which one access point (AP) establishes a plurality of links with one station (STA) using a plurality of different frequency channels and communications are performed simultaneously via the plurality of links has been examined.

In a wireless LAN, a plurality of communication apparatuses each acquire a transmission right in frequency resources based on the contention, and thus interference is a problem. In particular, there is known a hidden terminal problem in which a transmission side cannot recognize the presence of another terminal existing at a position where the terminal may interfere with a receiver. That is, since a transmission-side apparatus cannot recognize the presence of a hidden terminal, when the transmission-side apparatus and the hidden terminal simultaneously transmit signals, interference occurs in a reception-side apparatus, causing a failure in reception of the signals. To solve this problem, there is known a method that uses Request To Send (RTS) for suppressing acquisition of the transmission right by a terminal in the periphery of the transmission-side apparatus and Clear To Send (CTS) for suppressing acquisition of the transmission right by a terminal in the periphery of the reception-side apparatus. Japanese Patent Laid-Open No. 2014-195303 describes a technique in which when suppressing power consumption by transmitting a data signal with low power, acquisition of a transmission right by a peripheral terminal is suppressed by sending RTS and CTS packets with the maximum transmission power and power is reduced thereafter.

Since a new function is added like the above-described multi-link communication along with the development of the wireless LAN, the interference occurrence situation changes. Furthermore, as described above, it is required to further improve the throughput and the frequency use efficiency.

SUMMARY OF THE INVENTION

The present invention provides a communication control technique for allowing high efficiency communication in consideration of interference.

According to one aspect of the present invention, there is provided a communication apparatus of a wireless LAN complying with the IEEE802.11 standard series, comprising: one or more processors; and one or more memories that store a program for causing, when executed by the one or more processors, the communication apparatus to: determine, by executing Clear Channel Assessment (CCA) for determining whether a signal from another communication apparatus is detected at a power level not lower than a predetermined threshold in a frequency channel to be used, whether a signal can be transmitted in the frequency channel; transmit a Request To Send (RTS) packet in response to determination that the signal can be transmitted in the frequency channel: transmit data to a communication partner apparatus in a case where a Clear To Send (CTS) packet is received from the communication partner apparatus in response to the RTS packet; and control to use, in a case where the RTS packet is transmitted during a predetermined period after the communication apparatus shifts from a first state in which a signal cannot be received in the frequency channel to a second state in which a signal can be received in the frequency channel, second transmission power lower than first transmission power used in a case where the RTS packet is transmitted during a period different from the predetermined period.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

(Network Configuration)

Figure 1:
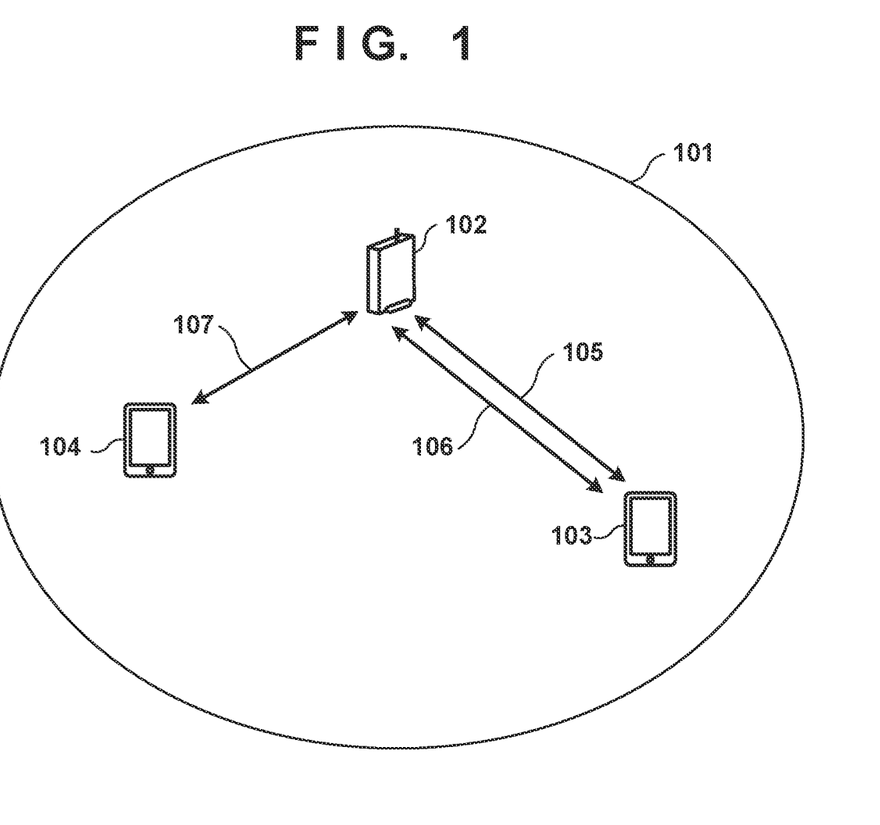
FIG. 1 is a view showing an example of the configuration of a wireless communication network.

FIG. 1 shows an example of the configuration of a network 101 according to an embodiment. The network 101 is a wireless local area network (LAN) including an access point (AP) capable of executing multi-link communication and a station (STA). The network 101 is constructed by an AP 102 capable of executing multi-link communication. Note that a communication device having a function of executing multi-link communication is called a Multi-Link Device (MLD). Particularly, an MLD having a role of operating as an AP to construct a network is called an AP-MLD, and an MLD having a role of joining the constructed network without operating as an AP is called a Non-AP-MLD. In this embodiment, the AP 102 is an AP-MLD. The wireless communication network shown in FIG. 1 includes Non-AP-MLDs 103 and 104 each of which has a function of executing multi-link communication and operates as an STA to communicate with the AP-MLD 102. Note that in this embodiment, the AP-MLD 102 and the Non-AP-MLDs 103 and 104 will sometimes collectively be referred to as communication apparatuses hereinafter.

All the communication apparatuses support the IEEE802.11be (Extremely/Extreme High Throughput (EHT)) standard, and can execute wireless communication in accordance with the IEEE802.11 be standard. Note that each communication apparatus is configured to be communicable in frequency bands of the 2.4-GHz band, 5-GHz band, and 6-GHz band. Note that the frequency bands usable by each communication apparatus are not limited to them and, for example, a different frequency band such as the 60-GHz band may be used. Each communication apparatus can perform communication using frequency bandwidths of 20 MHz, 40 MHz, 80 MHz, 160 MHz, and 320 MHz. Note that in the IEEE802.11 standard series, a "frequency channel" is defined, and a communication apparatus complying with the standard can execute wireless communication using the frequency channel. In the IEEE802.11 standard series, in each of the frequency bands of the 2.4-GHz band, 5-GHz band, and 6-GHz band, a plurality of frequency channels are defined. In the IEEE802.11 standard series, the bandwidth of each frequency channel is defined as 20 MHz. Note that by combining (bonding) the adjacent frequency channels, a bandwidth of 40 MHz or more can be used in one frequency channel.

In this embodiment, assume that the AP-MLD 102 and the Non-AP-MLD 103 establish a plurality of links via the plurality of frequency channels using the multi-link communication function, and can execute communication using the plurality of links. Assume also that the Non-AP-MLD 104 can execute communication with the AP-MLD 102 using at least one of the plurality of frequency channels used in the plurality of links established by the Non-AP-MLD 103. For example, the AP-MLD 102 establishes, with the Non-AP-MLD 103, a first link 105 using the first frequency channel in the 2.4-GHz band and a second link 106 using the second frequency channel in the 5-GHz band, and can communicate with the Non-AP-MLD 103 via both the links. In this case, the AP-MLD 102 maintains the first link 105 and the second link 106 simultaneously. By establishing the plurality of links using the plurality of frequency channels between the AP-MLD 102 and the Non-AP-MLD 103, it is possible to improve the throughput in communication between these communication apparatuses.

Note that the two links are established in the above-described example but three or more links may be established simultaneously. For example, between the AP-MLD 102 and the Non-AP-MLD 103, the third link (not shown) in the 6-GHz band may be established in addition to the first link 105 in the 2.4-GHz band and the second link 106 in the 5-GHz band. Furthermore, the AP-MLD 102 and the Non-AP-MLD 103 may establish a plurality of links for performing multi-link communication using a plurality of different frequency bands, as described above, or using different frequency channels in the same frequency band. Note that the plurality of frequency channels used in the plurality of links established between the AP-MLD 102 and the Non-AP-MLD 103 can be selected from channels having an interval of at least 20 MHz. In one example, the first link 105 and the second link 106 may be established using channels 1 and 11 in the 2.4-GHz band between the AP-MLD 102 and the Non-AP-MLD 103. Two or more of the plurality of links may be established using different frequency channels in the same frequency band, and the remaining links may be established in another frequency band. For example, between the AP-MLD 102 and the Non-AP-MLD 103, the first link 105 and the second link 106 can be established using channels 1 and 11 in the 2.4-GHz band and the third link (not shown) can be established using channel 36 in the 5-GHz band. When the plurality of links are established in the different frequency bands between the AP-MLD 102 and the Non-AP-MLD 103, even if the communication rate in a given frequency band decreases due to a heavy-load state or the like, a predetermined communication rate can be ensured by communication in another frequency band. Therefore, it is possible to suppress a decrease in throughput in communication between these communication apparatuses.

Each of the AP-MLD 102 and the Non-AP-MLD 103 can divide one data and transmit it to the partner apparatus via the plurality of links by multi-link communication. This makes it possible to transmit the one data at high speed. Each of the AP-MLD 102 and the Non-AP-MLD 103 can also transmit the same data via each of the plurality of links. According to this, with respect to communication via one link, communication via each of the remaining links can be set as backup communication. For example, assume that the AP-MLD 102 transmits the same data to the Non-AP-MLD 103 via the first link 105 and the second link 106 using the first frequency channel and the second frequency channel, respectively. In this case, for example, even if an error occurs in communication via the first link 105, the same data is transmitted via the second link 106. Therefore, the Non-AP-MLD 103 can receive the data transmitted from the AP-MLD 102.

The AP-MLD 102 and the Non-AP-MLD 103 may select a link to be used in accordance with the kind of frame or data to be communicated. For example, when transmitting data concerning a captured image, the AP-MLD 102 may use the first link 105 to transmit meta information such as the date, parameters (f-number and shutter speed) at the time of image capturing, and position information, and use the second link 106 to transmit pixel information. For example, the AP-MLD 102 may use the first link 105 to transmit a management frame, and use the second link 106 to transmit a data frame including data. The management frame is a management frame complying with the IEEE802.11 standard series. The management frame includes, for example, radio frames such as Beacon, Probe Request/Response, and Association Request/Response frames. In addition to these frames, the management frame can include radio frames such as Disassociation, Authentication. De-Authentication, and Action frames. The Beacon frame is a frame that makes a notification of network information. The Probe Request frame is a frame that requests network information, and the Probe Response frame is a response to the Probe Request frame and is a frame that provides the network information. The Association Request frame is a frame that requests connection, and the Association Response frame is a response to the Association Request frame and is a frame that indicates permission of connection or an error. The Disassociation frame is a frame used to disconnect the connection. The Authentication frame is a frame used to authenticate the partner apparatus. The De-Authentication frame is a frame used to interrupt authentication of the partner apparatus and execute disconnection of the connection. The Action frame is a frame used to execute an additional function other than the above-described ones.

The AP-MLD 102 and the Non-AP-MLD 103 may be configured to execute Multiple-Input and Multiple-Output (MIMO) communication. In this case, each of the AP-MLD 102 and the Non-AP-MLD 103 includes a plurality of antennas, and the transmission-side apparatus transmits, from the respective antennas, different signals formed by a plurality of data streams in the same frequency channel. The reception-side apparatus simultaneously receives, using the plurality of antennas, all the signals arriving from the antennas of the transmission-side apparatus, separates and extracts the plurality of data streams from the signals, and decodes them. As compared with a case in which no MIMO communication is executed, the AP-MLD 102 and the Non-AP-MLD 103 can communicate more data in the same time section by executing MIMO communication. Note that when performing multi-link communication, the AP-MLD 102 and the Non-AP-MLD 103 may execute MIMO communication in some links and execute no MIMO communication in the remaining links. The AP-MLD 102 and the Non-AP-MLD 103 may execute MIMO communication in all the links or execute no MIMO communication in all the links.

When executing multi-link communication, the AP-MLD 102 constructs a plurality of wireless networks corresponding to the plurality of links. In this case, the AP-MLD 102 internally includes a plurality of APs, and each AP operates to construct a wireless network. The plurality of APs internally included in the AP-MLD 102 may be implemented by preparing a plurality of physical circuits each functioning as an AR or the plurality of APs may virtually be implemented by one or a few physical circuits each functioning as an AP. For example, the AP-MLD 102 can include circuits the number of which is smaller than the number of logical APs. When executing multi-link communication, the Non-AP-MLD 103 can function as a plurality of STAs. To achieve this, the Non-AP-MLD 103 may prepare a plurality of physical circuits each functioning as an STA, or the plurality of STAs may virtually be implemented by circuits the number of which is smaller than the number of logical STAs. Note that if the plurality of links are established in the frequency channels belonging to the common frequency band, the plurality of links may be established in the common wireless network.

Note that each of the above-described communication apparatuses supports the IEEE802.11 be standard. In addition to this, each communication apparatus may support at least one of the legacy standards as standards defined before the IEEE802.11 be standard. The legacy standards include the IEEE802.11a/b/g/n/ac/ax standards. Note that in this embodiment, the IEEE802.11 standard series indicate at least one of the IEEE802.11a/b/g/n/ac/ax/be standards. Each of the above-described communication apparatuses may support another wireless communication standard in addition to the IEEE802.11 standard series, and may be configured to execute communication in accordance with the other wireless communication standard. The other wireless communication standard includes, for example, Bluetooth®, NFC, UWB, Zigbee®, and MBOA. Note that NFC is an abbreviation for Near Field Communication and UWB is an abbreviation for Ultra Wide Band. Furthermore, MBOA is an abbreviation for Multi Band Orthogonal Frequency Division Multiplexing (OFDM) Alliance. UWB includes wireless USB, wireless 1394, and Winet. Each communication apparatus may support communication standards of wired communication such as a wired LAN.

The AP-MLD 102 can be, for example, a wireless LAN router, a PC, or the like but is not limited to them. The AP-MLD 102 can be an arbitrary communication apparatus that can execute multi-link communication with another communication apparatus. The AP-MLD 102 may be an information processing apparatus such as a radio chip that can execute wireless communication complying with the IEEE802.11 be standard. Furthermore, the Non-AP-MLD 103 can be, for example, a camera, a tablet, a smartphone, a PC, a mobile phone, a video camera, or the like but is not limited to them. The Non-AP-MLD 103 can be an arbitrary communication apparatus that can execute multi-link communication with another communication apparatus. The Non-AP-MLD 103 may be an information processing apparatus such as a radio chip that can execute wireless communication complying with the IEEE802.11be standard. Note that the information processing apparatus such as a radio chip can include an antenna for transmitting a generated signal. Note that the Non-AP-MLD 104 can have the same function as that of the Non-AP-MLD 103. However, the present invention is not limited to this, and the Non-AP-MLD 104 can be an arbitrary communication apparatus that can perform communication in a frequency channel used in one of the links established for multi-link communication between the Non-AP-MLD 103 and the AP-MLD 102. In one example, the Non-AP-MLD 104 is described as an MLD but need not be an MLD. That is, the Non-AP-MLD 104 need not support multi-link communication.

FIG. 1 shows only one AP-MLD and two Non-AP-MLDs but the number of AP-MLDs and the number of Non-AP-MLDs are not limited to them. Note that in this embodiment, the AP-MLD 102 serves as an access point and the Non-AP-MLDs 103 and 104 serve as stations. The present invention, however, is not limited to this. For example, the AP-MLD 102 may also serve as a station. In this case, the AP-MLD 102 can operate as an apparatus that has a role of constructing a wireless network for establishing a link with the Non-AP-MLD 103 while serving as a station.

In multi-link communication, if the plurality of frequency channels respectively used in the plurality of links are sufficiently separated from each other in the frequency domain, it is possible to prevent radio signals transmitted/received in the links from interfering with each other. Therefore, the MLD can transmit/receive radio signals at arbitrary timings in the plurality of links. On the other hand, if the plurality of frequency channels respectively used in the plurality of links are close to each other to some extent in the frequency domain, interference between these links may unwantedly occur. That is, if the MLD starts a transmission operation in the second link while performing a reception operation in the first link, a radio wave emitted by the transmission operation in the second link enters. At this time, outside the band of the frequency channel used in the second link, as the separation from the frequency channel is larger in the frequency domain, the power of the entered radio wave attenuates more largely. However, since the transmission/reception device is the same and a loss in a transmission path is small, if the separation in the frequency domain is insufficient, the power level of loop interference is not negligible. As a result, the transmitted signal in the second link interferes with the received signal in the first link. Therefore, the MLD may not be able to receive a signal while transmitting a signal in the plurality of wireless links. In this case, the MLD can use the plurality of links without causing interference by adjusting the transmission/reception timings in the plurality of links. Note that the AP or STA that can execute transmission/reception at arbitrary timings in the plurality of links can be called a simultaneous transmit and receive (STR) device. On the other hand, the AP or STA that cannot execute transmission/reception at arbitrary timings in the plurality of links and needs to adjust transmission/reception timings can be called a Non-STR device.

In multi-link communication, communication can be performed independently in each of the plurality of links established using the plurality of frequency channels. For example, the MLD executes Clear Channel Assessment (CCA) defined in the IEEE802.11 standard series in each of the plurality of links. The CCA is a procedure of executing Energy Detection (ED) on the frequency channel and confirming, based on whether power exceeding an ED threshold is detected, whether the frequency channel is in use. The MLD can transmit a signal in the frequency channel determined, by the CCA, not to be in use. If the MLD receives a Request to Send (RTS) packet or a Clear to Send (CTS) packet in a given link, the MLD sets a period during which no communication is performed in the link. The RTS or CTS packet includes information for designating the device that transmits a signal and information for designating a Network Allocation Vector (NAV) value to be set. This prevents a device other than the device designated by the RTS or CTS packet from transmitting a signal during the designated NAV period. With this mechanism, the device that has not been designated by the packet among the devices that have received the RTS or CTS packet does not start transmission of a signal during the NAV period, thereby preventing collision of signals. Upon receiving the RTS or CTS packet in a given link, the MLD sets a NAV value corresponding to the period indicated by the packet not to transmit a signal in the link during the NAV period. Note that since the RTS or CTS packet is used to prevent occurrence of interference caused by transmission of a signal by a peripheral communication apparatus, the RTS or CTS packet is generally transmitted with sufficiently high power (for example, the maximum transmission power) so that communication apparatuses in a wide range can receive the packet.

Assume that the Non-AP-MLD 103 is a Non-STR device, and serves as two logical STAs (STA 1 and STA 2) to establish two wireless links with the AP-MLD 102 using two frequency channels. Assume also that, as a result of executing the CCA, the Non-AP-MLD 103 starts transmission of a signal only in STA 1 operating in the first frequency channel. After the completion of transmission of a signal by STA 1, the Non-AP-MLD 103 executes the CCA by STA 2. If power exceeding the ED threshold is not detected, the Non-AP-MLD 103 can transmit a signal in STA 2. On the other hand, since the Non-AP-MLD 103 is a Non-STR device, it receives no signal in STA 2 while transmitting a signal in STA 1. Therefore, even if another communication apparatus transmits the RTS or CTS packet in the second frequency channel on which STA 2 operates, the Non-AP-MLD 103 cannot receive the packet. For example, assume that while the Non-AP-MLD 103 transmits a signal in STA 1, the AP-MLD 102 transmits the CTS packet in response to the RTS packet transmitted from the Non-AP-MLD 104. In this case, the Non-AP-MLD 103 currently transmits the signal in STA 1, and thus cannot receive the RTS and CTS packets in STA 2. As a result, the Non-AP-MLD 103 sets no NAV value. If the Non-AP-MLD 103 can receive the signal from the Non-AP-MLD 104 with sufficient power, it can prevent transmission of the signal as a result of the CCA executed in STA 2 without receiving the RTS and CTS packets. On the other hand, if the Non-AP-MLD 103 cannot receive the signal from the Non-AP-MLD 104 with sufficient power, it starts transmission of a signal in STA 2, and the signal may collide against the transmitted signal from the Non-AP-MLD 104.

Note that even in a situation in which the STA connected to the AP operates in a power-saving mode, and performs packet transmission immediately after resuming from a Doze state, the STA cannot receive the RTS or CTS packet in the Doze state. Therefore, it can be assumed that the STA sets no NAV value, and starts transmission of a signal when a radio wave cannot be detected by the CCA, thereby causing collision against a signal from another STA. In consideration of this, the IEEE802.11 standard series defines a period called "NAVSyncDelay" and defines that the STA resuming from the Doze state stands by for the period and then starts transmission. This prevents the STA from transmitting a signal during the period corresponding to the NAV value that should be set by the RTS or CTS packet, thereby preventing the transmitted signal from colliding against a signal from another STA. Such NAVSyncDelay can be applied to the above-described multi-link communication. However, the application of NAVSyncDelay may cause a decrease in throughput or deterioration in frequency use efficiency.

In this embodiment, in consideration of this, the throughput and the frequency use efficiency are improved by allowing communication immediately after a signal transmittable state is set. An example of the arrangement of the communication apparatus (the AP-MLD 102 and the Non-AP-MLD 103) according to this embodiment and an example of a processing procedure executed by those communication apparatuses will be described in detail below.

(Apparatus Arrangement)

Figure 2A:
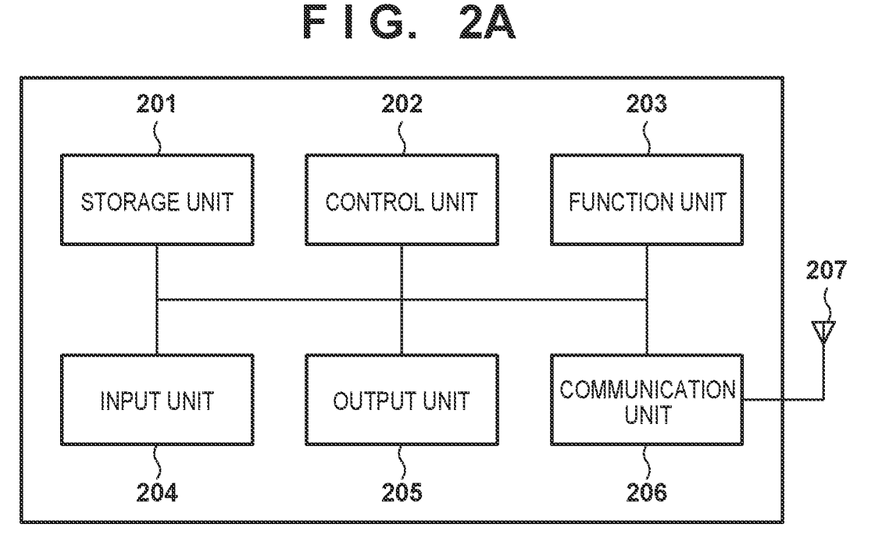
FIG. 2A is a block diagram showing an example of the arrangement of a communication apparatus.

An example of the arrangement of the communication apparatus (the AP-MLD 102 and the Non-AP-MLD 103) according to this embodiment will be described with reference to FIGS. 2A and 2B. FIG. 2A shows an example of the hardware arrangement of the communication apparatus. As shown in FIG. 2A, for example, the communication apparatus includes, as its hardware components, a storage unit 201, a control unit 202, a function unit 203, an input unit 204, an output unit 205, a communication unit 206, and an antenna 207.

The storage unit 201 is formed by including one or more memories such as a ROM and a RAM, and stores computer programs for performing various operations (to be described later), and various kinds of information such as communication parameters for wireless communication. Note that ROM is an acronym for Read Only Memory and RAM is an acronym for Random Access Memory. Note that in addition to or instead of the memory such as a ROM or a RAM, the storage unit 201 may include a storage medium such as a flexible disk, a hard disk, an optical disk, a magneto-optical disk, a CD-ROM, a CD-R, a magnetic tape, a nonvolatile memory card, or a DVD. The storage unit 201 may include a plurality of memories.

The control unit 202 is formed by one or more processors such as a CPU and an MPU, and controls the whole communication apparatus by executing computer programs stored in the storage unit 201. Note that CPU is an acronym for Central Processing Unit, and MPU is an acronym for Micro Processing Unit. The control unit 202 can be configured to execute processing of generating data or a signal to be transmitted in communication with another communication apparatus in addition to control of the whole communication apparatus. Note that the control unit 202 may be configured to execute processing such as control of the whole communication apparatus by cooperation of computer programs and an operating system (OS) stored in the storage unit 201. In addition, the control unit 202 may include a plurality of processors such as a multi-core processor, and execute processing such as control of the w % bole communication apparatus by the plurality of processors. The control unit 202 may be formed from an application-specific integrated circuit (ASIC), a digital signal processor (DSP), a field programmable gate array (FPGA), or the like.

In addition, the control unit 202 controls the function unit 203 to execute predetermined processing such as image capturing, printing, or projection. The function unit 203 is, for example, hardware used by the communication apparatus to execute predetermined processing. If, for example, the communication apparatus is a camera, the function unit 203 is an image capturing unit and performs image capturing processing. For example, if the communication apparatus is a printer, the function unit 203 is a print unit and performs print processing. For example, if the communication apparatus is a projector, the function unit 203 is a projection unit and performs projection processing. Data to be processed by the function unit 203 may be data stored in the storage unit 201, or may be data communicated with another communication apparatus via the communication unit 206 to be described later.

The input unit 204 accepts various kinds of operations from the user. The output unit 205 performs various kinds of outputs to the user. In this example, the output by the output unit 205 includes, for example, at least one of a display on a screen, an audio output by a loudspeaker, and a vibration output. Note that both the input unit 204 and the output unit 205 may be implemented by one module, like a touch panel. Furthermore, each of the input unit 204 and the output unit 205 may be incorporated in the communication apparatus, or may be configured as an external apparatus connected to the communication apparatus.

The communication unit 206 controls wireless communication complying with the IEEE802.11 standard series or controls IP communication. In this embodiment, the communication unit 206 is configured to particularly control wireless communication complying with the IEEE802.11be standard. Note that in addition to the IEEE802.11be standard, the communication unit 206 may control wireless communication complying with another IEEE802.11 standard or control wired communication by a wired LAN or the like. The communication unit 206 controls the antenna 207 to, for example, transmit/receive signals for wireless communication generated by the control unit 202. The communication apparatus may include a plurality of communication units 206. If the communication apparatus includes the plurality of communication units 206, when establishing a plurality of links in multi-link communication, one link can be established by one communication unit 206. Note that the communication apparatus may establish one link for each of some of the communication units 206, and establish a plurality of links for the remaining communication units 206. Alternatively, the communication apparatus may establish all the plurality of links using one communication unit 206. In this case, the communication unit 206 can execute communication via the plurality of links by time-divisionally switching the operating frequency channel. Note that if the communication apparatus supports the NFC standard or Bluetooth® standard in addition to the IEEE802.11 be standard, it may control wireless communication complying with these communication standards. If the communication apparatus can execute wireless communication complying with a plurality of communication standards, it may include a communication unit and an antenna supporting each communication standard. The communication apparatus communicates data such as image data, document data, or video data with another communication apparatus via the communication unit 206. Note that the antenna 207 may be prepared separately from the communication unit 206 or may be formed as one module combined with the communication unit 206.

The antennas 207 is an antenna configured to allow communication in various frequency bands such as sub-GHz band, the 2.4-GHz band, the 5-GHz band, and the 6-GHz band. Note that the communication apparatus may include, as the antenna 207, one antenna such as a multiband antenna or a plurality of antennas respectively corresponding to the plurality of frequency bands. If the communication apparatus includes a plurality of antennas, it may include one communication unit 206 for the plurality of antennas or a plurality of communication units 206 respectively corresponding to the plurality of antennas. Note that the antenna 207 may be a single antenna or an antenna array. That is, the antenna 207 may include a plurality of antenna elements, and may be configured to execute, for example, Multi-Input and Multi-Output (MIMO) communication.

Figure 2B:
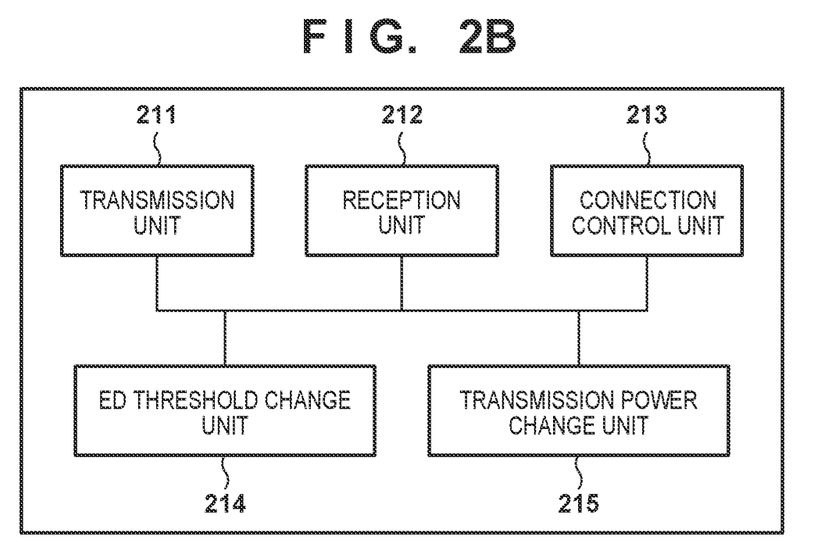
FIG. 2B is a block diagram showing an example of the arrangement of the communication apparatus.

FIG. 2B shows an example of the functional arrangement of the communication apparatus (the AP-MLD 102 and the Non-AP-MLD 103). For example, the communication apparatus includes, as its function units, a transmission unit 211, a reception unit 212, a connection control unit 213, an ED threshold change unit 214, and a transmission power change unit 215. At least some of the function units may be implemented when, for example, the control unit 202 executes computer programs stored in the storage unit 201, or may be implemented using dedicated hardware components. At least some of the function units may be implemented by a baseband chip or an RF chip in the communication unit 206.

The transmission unit 211 performs signal transmission processing (for example, transmission processing of a radio signal generated in accordance with the IEEE802.11 standard series) via the communication unit 206. The reception unit 212 performs signal reception processing (for example, reception processing of a radio signal generated in accordance with the IEEE802.11 standard series) via the communication unit 206. The connection control unit 213 performs control for establishing connection to another communication apparatus as a communication partner by transmitting/receiving various frames via the transmission unit 211 and the reception unit 212. The ED threshold change unit 214 controls the reception unit 212 to change the threshold of the reception power of a radio wave when determining by the CCA whether the channel is in a usable state. The transmission power change unit 215 controls the transmission unit 211 to change the transmission power of a packet to be transmitted.

(Procedure of Communication)

Figure 3:
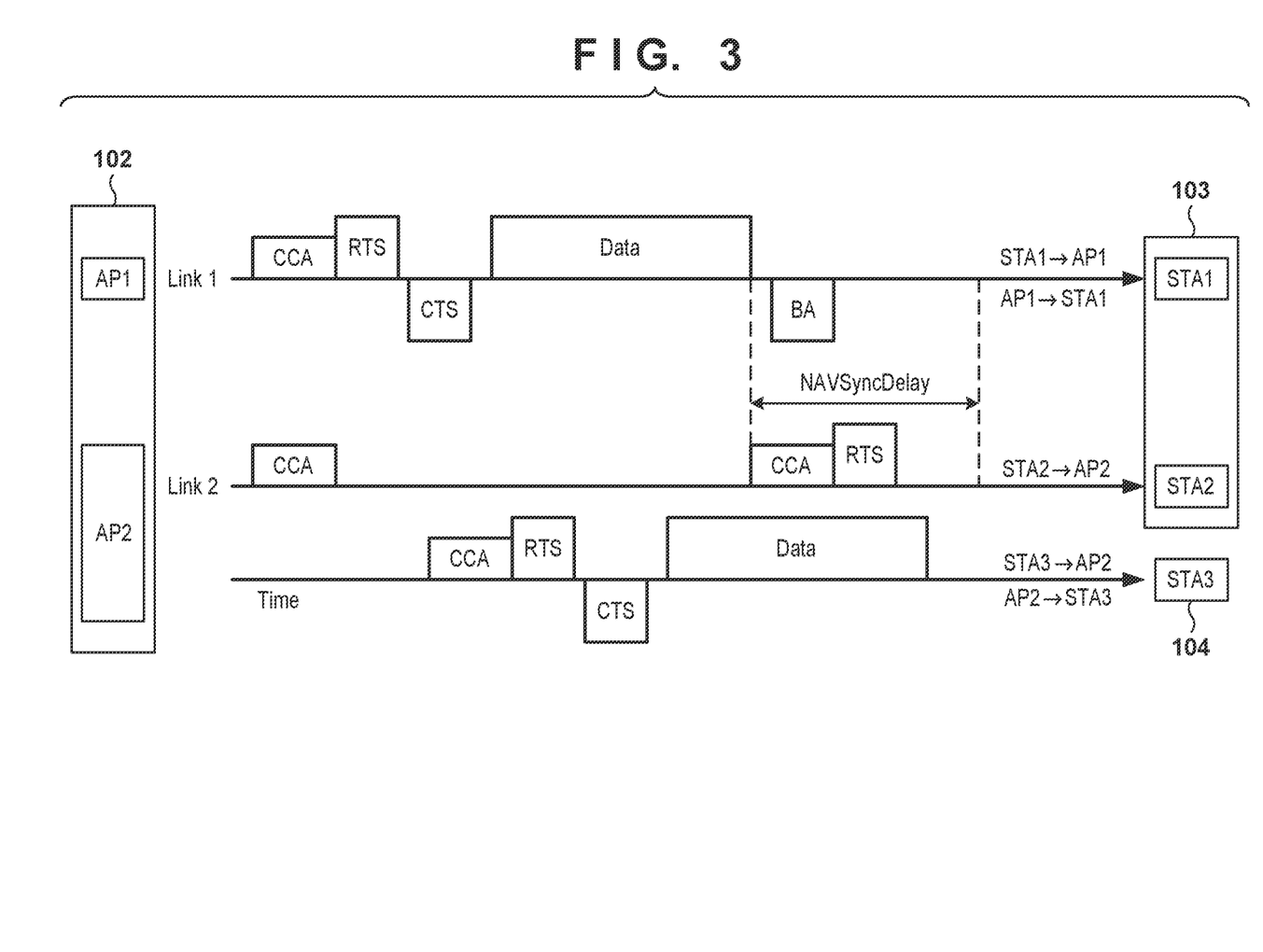
FIG. 3 is a view showing an example of the procedure of multi-link communication processing.

Subsequently, the procedure of communication executed in this embodiment will be described. An example of the procedure of a transmission/reception operation in multi-link communication will first be described with reference to FIG. 3. Note that FIG. 3 shows an example when data is transmitted from each of the Non-AP-MLDs 103 and 104 to the AP-MLD 102. Note that the AP-MLD 102 and the Non-AP-MLD 103 establish connection for each of the first link 105 and the second link 106, as shown in FIG. 1. Referring to FIG. 3, the AP function used by the AP-MLD 102 in the frequency channel of the first link 105 is represented by "AP 1", and the AP function used by the AP-MLD 102 in the frequency channel of the second link 106 is represented by "AP 2". The STA function used by the Non-AP-MLD 103 in the frequency channel of the first link 105 is represented by "STA 1" and the STA function used by the Non-AP-MLD 103 in the frequency channel of the second link 106 is represented by "STA 2". In the frequency channel of the second link 106, the Non-AP-MLD 104 and the AP-MLD 102 establish a third link 107. Referring to FIG. 3, the STA function used by the Non-AP-MLD 104 in the third link 107 is represented by STA 3.

Assume that the frequency channels used in the first link 105 and the second link 106 are close to each other to some extent in the frequency domain. Therefore, a signal transmitted by the Non-AP-MLD 103 using the STA function corresponding to one of the first link 105 and the second link 106 is received with sufficient strength using the STA function corresponding to the other link. Thus, if one of STA 1 and STA 2 transmits the first signal, and the other STA receives the second signal, the first signal may interfere with the second signal at a non-negligible level. Accordingly, the Non-AP-MLD 103 is restricted such that it cannot receive a signal in one link while transmitting a signal in the other link. That is, the Non-AP-MLD 103 is a Non-STR device. To perform multi-link communication with the Non-AP-MLD 103 as a Non-STR device, the AP-MLD 102 needs to perform adjustment so that the Non-AP-MLD 103 is not set in a reception state using one link while transmitting a signal in the other link.

Referring to FIG. 3, the Non-AP-MLD 103 executes the CCA to cause STA 1 and STA 2 to simultaneously transmit signals to the AP-MLD 102. As shown in FIG. 3 with respect to the first link, if it is determined by the CCA that it is possible to transmit a signal, the Non-AP-MLD 103 transmits an RTS packet. Upon receiving the RTS packet, the AP-MLD 102 transmits a CTS packet. Upon receiving the CTS packet, the Non-AP-MLD 103 transmits a data packet including transmission target data to the AP-MLD 102. If the AP-MLD 102 successfully receives the data packet, it transmits an acknowledgement (ACK) or block ACK (BA) to the Non-AP-MLD 103. This completes a series of processes associated with data transmission from the Non-AP-MLD 103 to the AP-MLD 102.

On the other hand, as shown in FIG. 3, even if the Non-AP-MLD 103 determines by the CCA that it is possible to transmit a signal in the first link 105, it may determine by the CCA that it is impossible to transmit a signal in the second link 106. In this case, in the Non-AP-MLD 103, while STA 1 corresponding to the first link 105 executes signal transmission processing by transmitting an RTS packet to AP 1, STA 2 corresponding to the second link 106 stands by without performing signal transmission processing. To allow STA 2 to transmit a signal, it is necessary to determine by re-executed the CCA that it is possible to transmit a signal. On the other hand, in the Non-AP-MLD 103, while STA 1 executes transmission processing, STA 2 cannot perform reception processing. Therefore, in the Non-AP-MLD 103, while STA 1 transmits a signal, the CCA performed by the reception operation in the STA cannot be executed. Thus, after standing by until STA 1 completes transmission of the data packet, STA 2 can start the CCA. On the other hand, to complete the transmission processing of the data packet, STA 1 needs to receive an ACK or BA from the AP. To the contrary, if STA 2 starts transmission of a signal while STA 1 receives an ACK or BA, the transmission operation interrupts the reception of the ACK or BA. Thus, STA 2 needs to start the transmission operation after the end of the reception of the ACK or BA. Therefore, the Non-AP-MLD 103 determines a timing of starting the CCA in STA 2 so that the CCA is completed after a timing at which STA 1 completes the reception of the ACK or BA. If the Non-AP-MLD 103 determines by the CCA re-executed in STA 2 that it is possible to transmit a signal, STA 2 can transmit an RTS packet to AP 2 of the AP-MLD 102. If the Non-AP-MLD 103 receives a response of a CTS packet from AP 2 of the AP-MLD 102, STA 2 can transmit a data packet to AP 2.

On the other hand, while STA 1 of the Non-AP-MLD 103 transmits a signal, the Non-AP-MLD 104 can execute the CCA to start transmission of a data packet in the frequency channel of the second link 106. In this case, the Non-AP-MLD 104 transmits an RTS packet, and receives a CTS packet from the AP-MLD 102, thereby starting data transmission. Since the Non-AP-MLD 103 can receive a CTS packet even if no multi-link communication is performed, the Non-AP-MLD 103 is an STR device, or no RTS packet can be received, the Non-AP-MLD 103 does not interrupt communication of the Non-AP-MLD 104 by setting a NAV value. However, since the Non-AP-MLD 103 is a Non-STR device and currently transmits a signal in the first link 105, it cannot receive the RTS or CTS packet. If the Non-AP-MLD 103 can execute the CCA in the second link 106 and detect the data packet from the Non-AP-MLD 104, it transmits no signal, thereby making it possible to prevent occurrence of interference. On the other hand, even if the Non-AP-MLD 103 executes the CCA in the second link 106, the signal transmitted from the Non-AP-MLD 104 may not be detected. That is, depending on the positional relationship between the Non-AP-MLDs 104 and 103, the Non-AP-MLD 103 may not be able to detect the signal from the Non-AP-MLD 104 at a power level equal to or higher than the signal detection (ED) threshold. In this case, the Non-AP-MLD 103 determines by the CCA that it is possible to transmit a signal in STA 2, and transmits an RTS packet. Thus, the RTS packet may interfere with the signal transmitted from the Non-AP-MLD 104.

Figure 4:
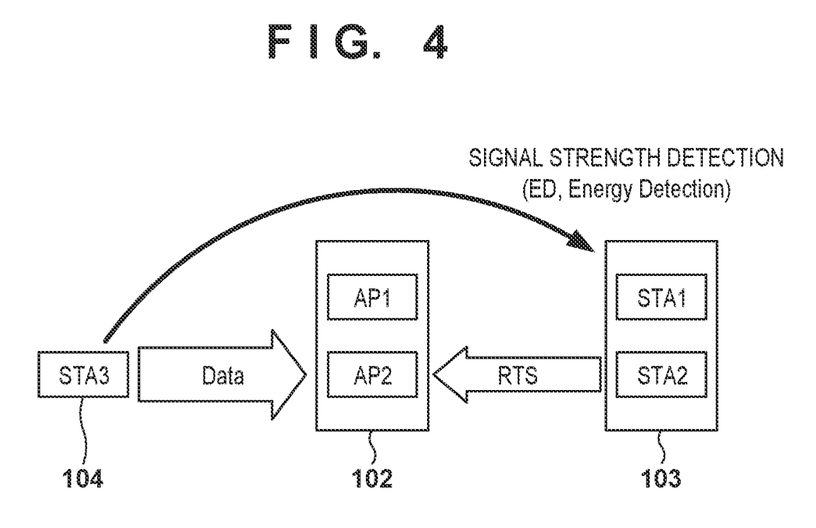
FIG. 4 is a view schematically showing an example of a communication state in multi-link communication.

FIG. 4 is a view schematically showing the state of the wireless communication system at timings before and after STA 2 of the Non-AP-MLD 103 transmits an RTS packet to AP 2 of the AP-MLD 102. In the Non-AP-MLD 104, STA 3 transmits the data packet to AP 2 of the AP-MLD 102. This signal is received by AP 2 of the AP-MLD 102. At this time, it is determined by the CCA in another peripheral communication apparatus (for example, STA 2 of the Non-AP-MLD 103) whether the signal is received at a predetermined level or higher. In the IEEE802.11 standard series, the ED threshold of the CCA is defined as −62 dBm or less per 20 MHz. That is, the communication apparatus complying with the IEEE802.11 standard series can set the ED threshold to −62 dBm or less per 20 MHz. If the signal is detected with reception power equal to or higher than the threshold, the communication apparatus determines that it cannot transmit a signal. On the other hand, if the signal is not detected with power equal to or higher than the threshold, even if a signal can be detected with power lower than the threshold, the communication apparatus can determine that it can transmit a signal. For example, if, in STA 2, the ED threshold is set to −62 dBm as the upper limit of the defined value, and the received signal strength of the data packet of STA 3 is smaller than −62 dBm. STA 2 determines by the CCA that it is possible to transmit a signal. Therefore, when STA 2 transmits an RTS packet to AP 2, the data packet from STA 3 may collide against the RTS packet from STA 2 in AP 2.

To the contrary, by setting a NAVSyncDelay time period, as described above, it is possible to prevent occurrence of interference. That is, the Non-AP-MLD 103 stands by for the NAVSyncDelay time period since a timing at which STA 1 completes transmission of the signal and STA 2 can perform a reception operation, thereby preventing a signal from being transmitted. By standing by for this time period, it is possible to prevent a signal from being transmitted before the completion of transmission of a data packet, such as the data packet of STA 3, being executed in the periphery at a timing when the reception operation of STA 2 starts. However, this means that even if another peripheral communication apparatus transmits no signal during the NAVSyncDelay time period, STA 2 cannot transmit a signal during the time period, and there is room for improving the frequency use efficiency in terms of this point. Therefore, this embodiment provides a method of allowing transmission of a signal before the NavSyncDelay time period elapses. Note that the NavSyncDelay time period is a time period used when resuming from the Doze state in the power-saving mode. Thus, the description pays attention to multi-link communication but a method to be described below can be applied to a case in which the STA resumes from the Doze state in the power-saving mode. Along with the development of the wireless LAN standards in the future, another situation in which the STA resumes from a state in which it is impossible to receive a signal may occur but the method to be described below can be applied even in that situation.

To transmit a signal during the NAVSyncDelay time period, a signal transmitted by a hidden terminal is detected with high sensitivity by decreasing the ED threshold used in the CCA during the NAVSyncDelay time period, thereby avoiding collision of the signals. Note that at this time, a period during which the ED threshold is decreased is limited to the NavSyncDelay time period, thereby making it possible to minimize the influence on the normal operation. That is, STA 2 performs signal detection using the normal ED threshold in the second link 106 shown in FIG. 3 in the first CCA since the first CCA is executed out of the NAVSyncDelay time period, and performs high-sensitivity signal detection in the second CCA by decreasing the ED threshold, as compared with the first CCA.

Furthermore, transmission power of an RTS packet transmitted by the STA after it is determined by the CCA that it is possible to transmit a signal is adjusted so that interference of the RTS packet with a signal when another communication apparatus transmits the signal is sufficiently suppressed. In a situation in which there is a signal that cannot be detected even using the decreased ED threshold and the RTS packet collides against the signal, interference of the RTS packet with the signal is suppressed. For example, if the received signal strength of the data packet from STA 3 is sufficiently larger than that of the RTS packet from STA 2 in AP 2 shown in FIG. 4, it can be expected that AP 2 can normally receive the data packet from STA 3. That is, if the signal-to-noise-plus-interference ratio (SINR) when the data packet from STA 3 is a desired signal and the RTS packet from STA 2 is an interference signal that is equal to or higher than a predetermined value, AP 2 can normally receive the data packet from STA 3 with sufficiently high probability.

In general, the RTS packet is transmitted with highest power at the lowest data rate to notify wireless devices in a range as wide as possible that the self-device starts transmission. However, if the AP currently receives the data packet, the RTS packet signal transmitted with high power interferes with the data packet in the AP, causing a packet error. On the other hand, since the RTS packet is transmitted using the lowest data rate, even if the received signal strength is small in AP 2 as the destination, it can be expected that AP 2 can normally receive the RTS packet. In fact, if the communication apparatus complying with the IEEE802.11 standard obtains a received signal strength of −82 dBM or more, it is obliged to be able to receive, with a packet error rate (PER) of 10% or less, the OFDM signal at the lowest data rate in the 20-MHz bandwidth. Then, there actually exist many communication apparatuses that can correctly receive a signal even with smaller received signal strength.

As described above, while AP 2 receives no data packet, AP 2 can receive the RTS packet at a low reception power level. If AP 2 normally receives the RTS packet, it transmits a CTS packet. Note that the CTS packet is transmitted from AP 2 with transmission power equal to the normal transmission power. When the transmission power of the RTS packet from STA 2 is set low, the reachable range of the RTS packet is narrow. However, since the CTS packet is transmitted with sufficient power, it is possible to cause another communication apparatus existing in the reachable range of the signal of AP 2 to appropriately set the NAV value. If STA 2 receives the CTS packet from AP 2, it can determine that a hidden terminal transmits no data packet to AP 2. Therefore, in this case, STA 2 can transmit a data packet to AP 2 with the normal transmission power.

On the other hand, for example, if AP 2 receives a data packet from STA 3, it cannot normally receive the RTS packet due to interference by the data packet. Thus, in this case, AP 2 transmits no CTS packet. If STA 2 receives no CTS packet, it determines that AP 2 receives a data packet from a hidden terminal (STA 3), and does not transmit a data packet. Note that in this case, even if an RTS packet is transmitted while receiving a data packet, the data packet is dominant in the received signals, and thus AP 2 can normally receive the data packet. Note that if STA 2 receives no CTS packet, it is assumed that the RTS packet or the CTS packet for setting the NAV value should actually have been received before the start of the CCA. Therefore, in this case, STA 2 stands by for the NAVSyncDelay time period since the timing at which a reception operation can be executed. This can surely prevent a signal from being transmitted during the NAV period that may have been set if STA 2 has received the RTS or CTS packet.

With these processes, for example, STA 2 can suppress, when a data packet is transmitted from STA 3, interference with the data packet, and can transmit, when no data packet is transmitted, a data packet with the normal transmission power.

(Procedure of Signal Transmission Processing)

Figure 5A:
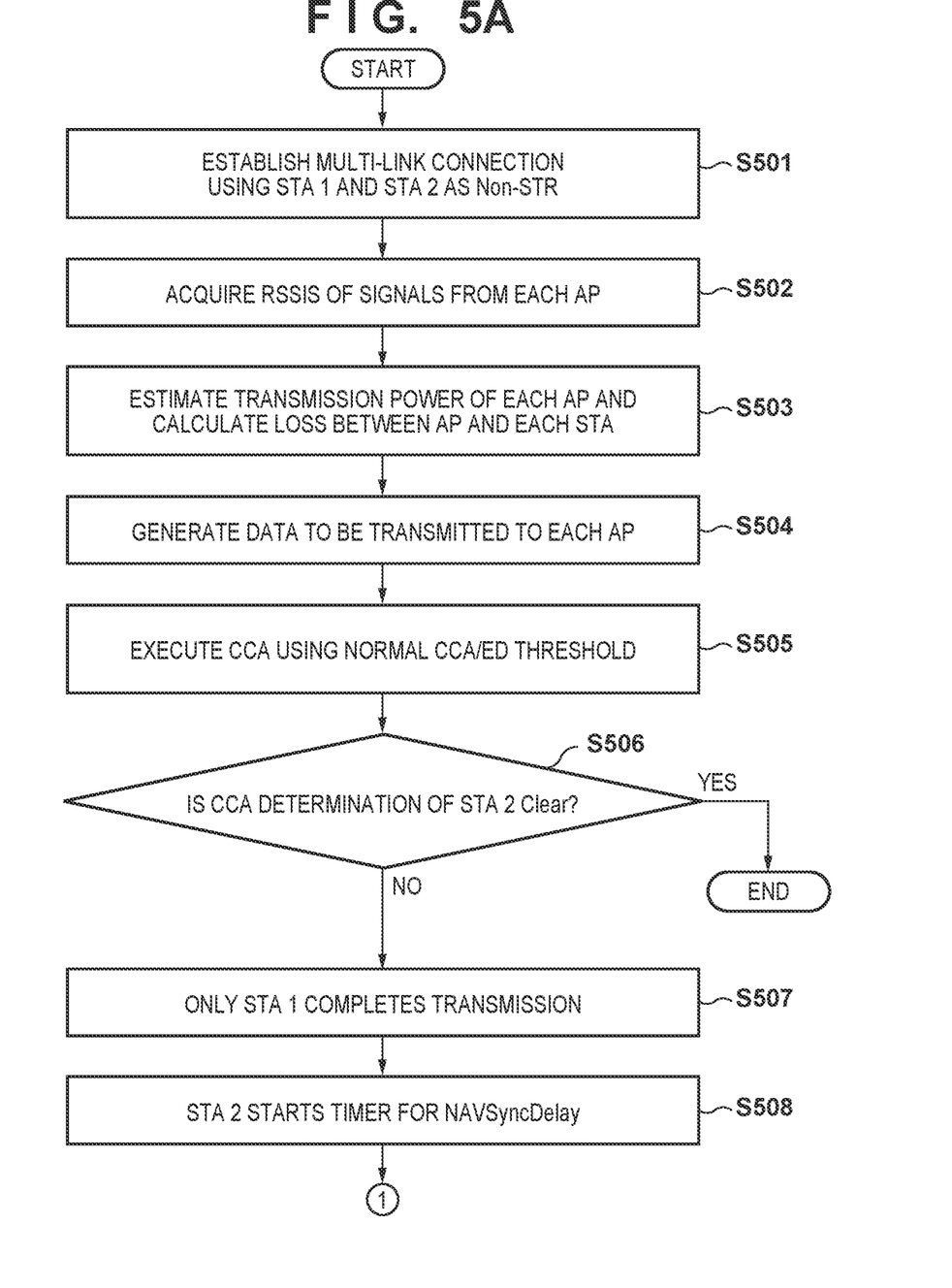
FIGS. 5A and 5B show a flowchart illustrating the first example of a processing procedure executed by the communication apparatus.
Figure 5B:
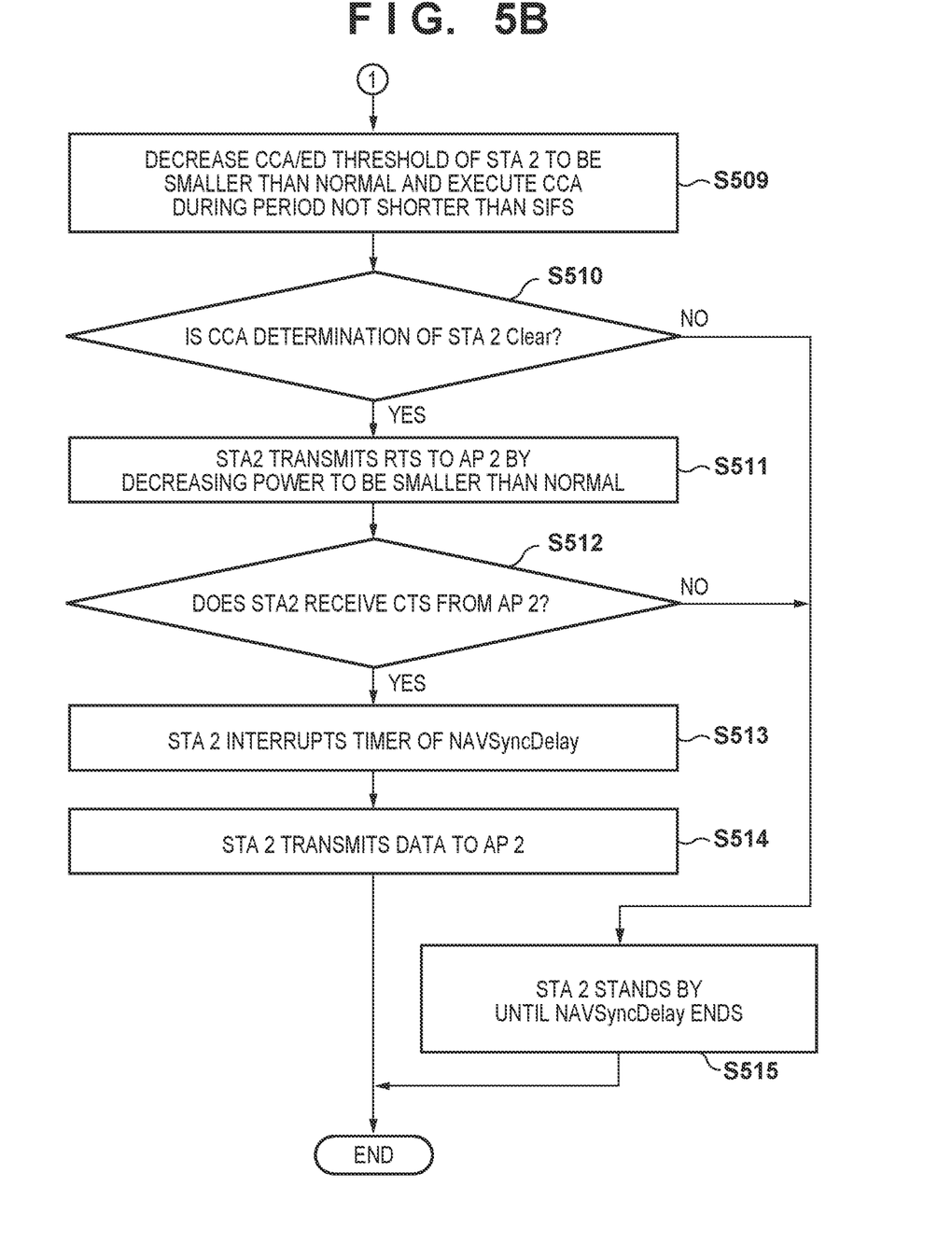

An example of the procedure of the above-described signal transmission processing executed by the transmission-side communication apparatus according to this embodiment will be described with reference to FIGS. 5A and 5B. Note that the transmission-side communication apparatus that executes the processing shown in FIGS. 5A and 5B is the Non-AP-MLD 103, and the reception-side communication apparatus is the AP-MLD 102. The Non-AP-MLD 103 is a Non-STR device, and cannot perform a reception operation in another link while transmitting a signal in one of a plurality of links established with the AP-MLD 102. Note that this is merely an example, and for example, the AP-MLD 102, the transmission-side STA in communication between the STAs, or the like may execute the processing shown in FIGS. 5A and 5B. The processing shown in FIGS. 5A and 5B can be implemented when the control unit 202 of the Non-AP-MLD 103 executes a control program stored in the storage unit 201, and executes calculation and processing of information and control of each hardware component.

First, the Non-AP-MLD 103 establishes a plurality of links with the AP-MLD 102 for multi-link communication (S501). For example, the plurality of STA functions (STA 1 and STA 2) included in the Non-AP-MLD 103 establish wireless links with the plurality of AP functions included in the AP-MLD 102, thereby establishing the plurality of links. Note that in this processing example, the Non-AP-MLD 103 is a Non-STR device, and thus control is executed so that the transmission and reception timings coincide with each other in each link to perform transmission simultaneously in the plurality of links or reception simultaneously in the plurality of links.

Subsequently, the Non-AP-MLD 103 acquires, in the plurality of links, the received signal power indicators (RSSIs) of signals transmitted from the plurality of APs (AP 1 and AP 2), respectively (S502). The Non-AP-MLD 103 estimates the signal transmission power of each AP, and calculates a propagation loss based on the estimated value and the RSSI (S503). Note that if it is known that, for example, a predetermined value is used as the transmission power of the signal transmitted from the AP, the value is set as the estimated value. If, for example, the transmission power is determined in accordance with the type of frame, the estimated value of the transmission power can be specified by estimating the type of frame. For example, to estimate the propagation loss, a beacon periodically transmitted from the AP may be used. Note that the transmission power when the AP transmits the beacon is not always constant but, for example, 15 dBm generally used can be specified as the estimated value of the transmission power of the beacon. The signal transmission power of the AP may be specified using AP Tx Power included in a Common Info field in a Trigger frame adopted in the IEEE802.11 ax standard. When information capable of specifying the transmission power is included in, for example, the beacon or another signal, a peripheral communication apparatus may be notified of the signal transmission power of the AP. The propagation loss can be calculated by, for example, subtracting the value of the RSSI from the estimated value of the transmission power. By calculating the propagation loss, the STA can estimate the signal reception power in the AP based on a difference value obtained by subtracting the value of the propagation loss from the signal transmission power when transmitting a packet to the AP. The calculated propagation loss is stored in the storage unit 201.

After that, assume that data to be transmitted to the AP-MLD 102 is generated in the Non-AP-MLD 103 (S504). Since the Non-AP-MLD 103 is a Non-STR device, it starts control such that STA 1 and STA 2 can transmit signals simultaneously, and executes the CCA using the normal ED threshold for both STA 1 and STA 2 (S505). Then, the Non-AP-MLD 103 determines whether each of STA 1 and STA 2 can transmit a signal (S506). Assume that as a result of the CCA in STA 1, STA 1 can transmit a signal. That is, in step S506, depending on whether it is determined that STA 2 can transmit a signal, it is determined in step S506 whether only STA 1 or both STA 1 and STA 2 can transmit a signal. Note that if neither STA 1 nor STA 2 can transmit a signal, the processing in step S505 is re-executed, and the processing is repeated until it becomes possible to transmit a signal in any of the links. If it is determined that only STA 2 can transmit a signal, STA 1 and STA 2 can be exchanged to execute the following processing.

If the Non-AP-MLD 103 determines that both STA 1 and STA 2 can transmit signals (YES in step S506), each of STA 1 and STA 2 executes normal data transmission processing of, for example, transmitting an RTS packet to the corresponding connected AP. Then, this processing ends. On the other hand, if the Non-AP-MLD 103 determines, by determination of the CCA, that STA 2 cannot transmit a signal (NO in step S506), STA 2 does not start transmission, and only STA 1 executes a series of transmission processes from transmission of an RTS packet (S507). Note that since the Non-AP-MLD 103 is a Non-STR device, STA 2 cannot perform a reception operation while STA 1 transmits a signal. After that, if STA 1 completes signal transmission and STA 2 can receive a signal, the Non-AP-MLD 103 starts a timer to stand by for the NAVSyncDelay time period in STA 2 (S508).

Then, the Non-AP-MLD 103 decreases the ED threshold in STA 2 to be smaller than the normal ED threshold (for example, the ED threshold used in step S505) and executes the CCA (S509). As the ED threshold is smaller, it is possible to detect a signal of a hidden terminal existing farther. On the other hand, if the ED threshold is made excessively small, it is determined that a signal is detected due to noise other than wireless communication, and it may be impossible to perform communication. Thus, the decreased ED threshold can be set to, for example, an adaptive value corresponding to an implementation environment or an experimentally obtained appropriate value. In one example, since the minimum reception sensitivity at the lowest data rate defined in the IEEE802.11 standard series is about −82 dBm, the minimum reception sensitivity (−82 dBm) may be set as the decreased ED threshold. Note that if AP 1 of the AP-MLD 102 receives a data packet from STA 1 of the Non-AP-MLD 103, it stands by for the SIFS period, and then transmits an ACK or block ACK. Note that SIFS is an abbreviation for Short Inter Frame Space. The Non-AP-MLD 103 cannot perform transmission in STA 2 before STA 1 receives an ACK or block ACK. Therefore, the Non-AP-MLD 103 adjusts the execution timing of the CCA so that the CCA ends after the completion of the reception of the ACK or block ACK, that is, so that the CCA is executed during a period equal to or longer than the SIFS period.

Then, the Non-AP-MLD 103 determines, based on the CCA with the decreased ED threshold, whether it is possible to transmit a signal (S510). If the Non-AP-MLD 103 determines, by the CCA with the decreased ED threshold, that STA 2 cannot transmit a signal (NO in step S510), the Non-AP-MLD 103 stands by without transmitting a signal until the timer started in step S508 passes the NAVSyncDelay time period (S515). This makes it possible to stand by until the period corresponding to the NAV value that may be set when an RTS packet or a CTS packet arrives while STA 2 cannot receive a signal elapses. After the NAVSyncDelay time period elapses, the Non-AP-MLD 103 can return the ED threshold to the normal value and execute normal multi-link communication.

If the Non-AP-MLD 103 determines, by the CCA with the decreased ED threshold, that STA 2 can transmit a signal (YES in step S510), the transmission power is decreased in STA 2 to transmit an RTS packet to AP 2 (S511). In this example, the transmission power of the RTS packet by STA 2 can be calculated using the propagation loss estimated in step S503 and a target value of the signal reception power in AP 2. For example, as the target value of the signal reception power in AP 2, the value of the minimum reception sensitivity corresponding to the transmission rate used to transmit the RTS packet and defined in the IEEE802.11 standard series can be used. If the actual minimum reception sensitivity of AP 2 is larger in margin than the value defined in the IEEE802.11 standard series, a value smaller than the value defined in the standard may be used as the target value of the signal reception power. If the signal reception power when receiving the RTS packet from AP 2 is designated, the value may be used as the target value.

In the Non-AP-MLD 103, after STA 2 transmits, to AP 2, the RTS packet with decreased transmission power, it is determined whether STA 2 receives the CTS packet from AP 2 (for example, within a predetermined period equal to or longer than the SIFS period) (S512). If STA 2 receives no CTS packet from AP 2 (NO in step S512), the Non-AP-MLD 103 stands by without transmitting a signal until the timer started in step S508 passes the NAVSyncDelay time period (S515). That is, since the Non-AP-MLD 103 can determine that AP 2 may currently receive a signal from a hidden terminal such as STA 3, it stands by without transmitting a signal. Then, after the NAVSyncDelay time period elapses, the Non-AP-MLD 103 can return the ED threshold to the normal value and execute normal multi-link communication.

If STA 2 receives the CTS packet from AP 2 (YES in step S512), the Non-AP-MLD 103 can determine that it is possible to transmit a signal to AP 2. Note that in this case, the NAV value is set in another peripheral communication apparatus by the CTS packet transmitted from AP 2. Then, the Non-AP-MLD 103 interrupts the timer started in step S508 (S513). In addition, the Non-AP-MLD 103 returns the changed ED threshold and the changed signal transmission power to the normal state. Then, the Non-AP-MLD 103 causes STA 2 returned to the normal state to transmit a data packet to AP 2 (S514). After that, the Non-AP-MLD 103 can execute normal multi-link communication.

With the above processing, it is possible to improve the communication efficiency while suppressing the possibility of occurrence of communication collision in multi-link communication. Since the signal transmission power can be changed by the same technique as transmission power control requested in an OFDMA uplink, it is unnecessary to change additional hardware. Furthermore, since change of control of the Non-AP-MLD 103 suffices, it is possible to obtain the effect by the above-described method without changing the AP-MLD 102.

Figure 6A:
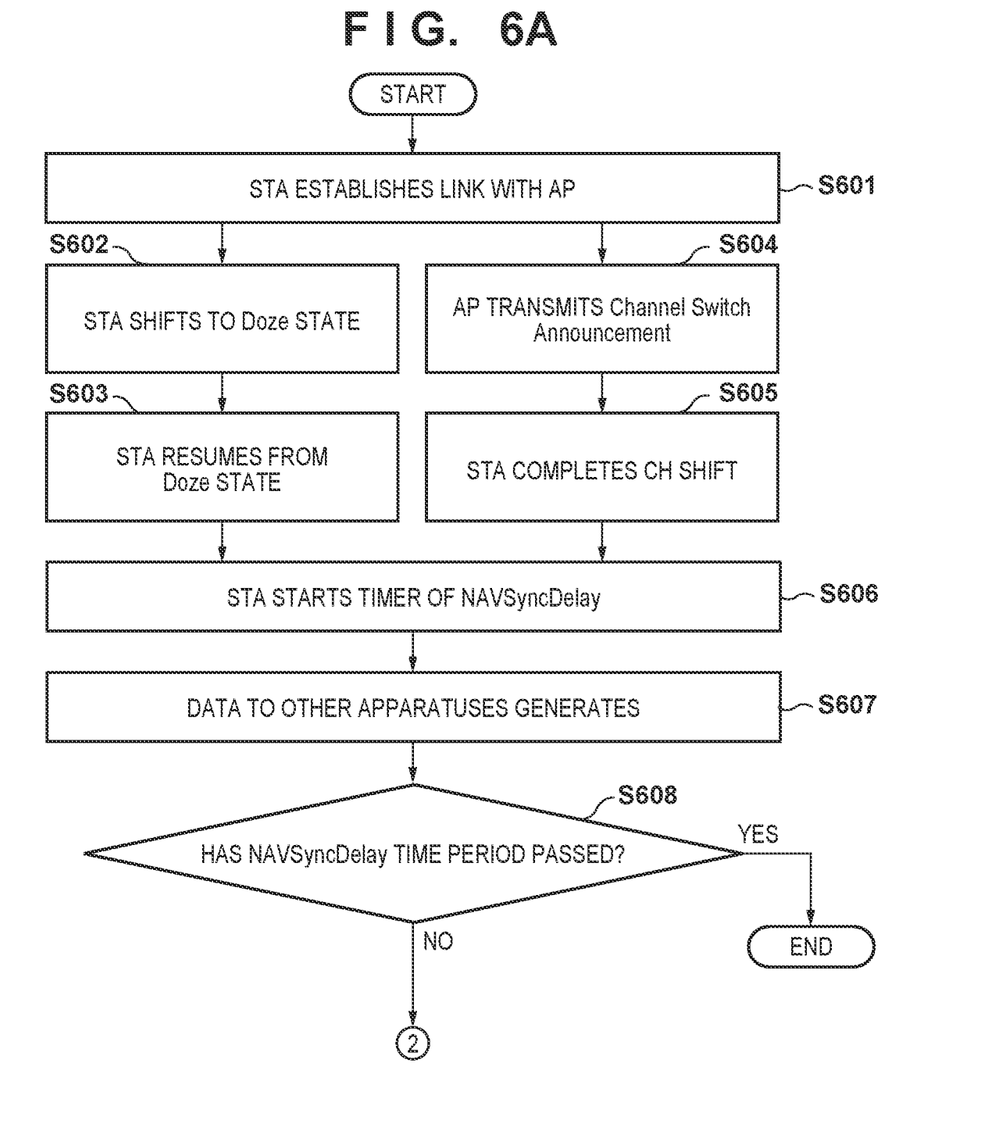
FIGS. 6A and 6B show a flowchart illustrating the second example of the processing procedure executed by the communication apparatus.
Figure 6B:
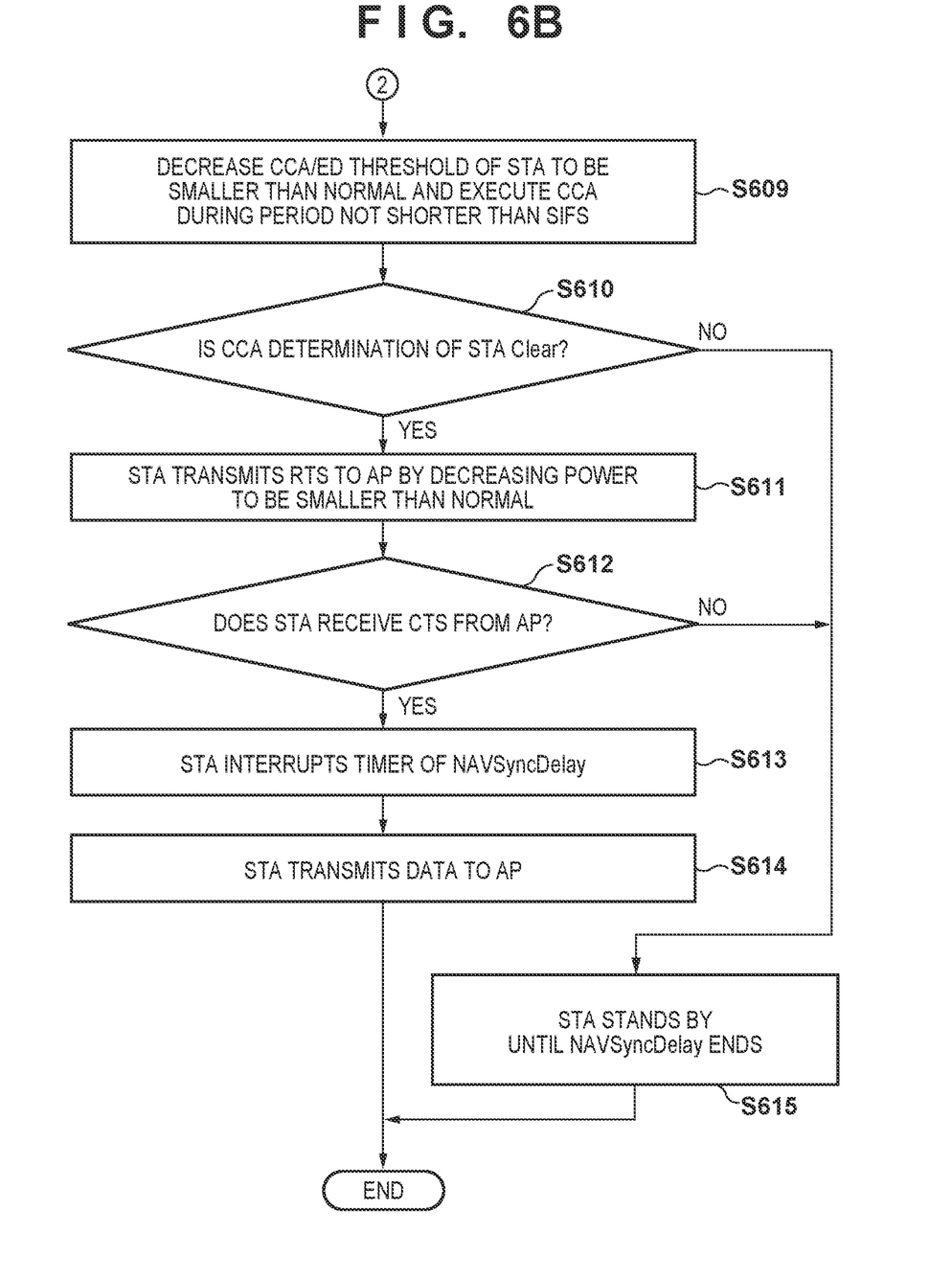

Note that the above description assumes that the Non-AP-MLD 103 performs multi-link communication but the present invention is not limited to this. For example, if, immediately before the CCA is executed, the Non-AP-MLD 103 is in a state in which it is impossible to execute a reception processing in the frequency channel for which the CCA is to be executed, the same processing as the above-described one can be executed. This will be described with reference to FIGS. 6A and 6B. FIGS. 6A and 6B shows an example of the procedure of processing when a wireless LAN STA having the same function as that of the Non-AP-MLD 103 is connected to the AP in the power-saving mode. Note that this processing can be implemented when the STA has the arrangement shown in FIGS. 2A and 2B, and the control unit 202 executes a control program stored in the storage unit 201 and executes calculation and processing of information and control of each hardware component.

In this processing, the STA establishes a wireless LAN link with the AP (S601). Note that multi-link connection may be established or only single link connection may be established. In one example, the STA establishes connection to the AP in the power-saving mode. After the STA establishes connection in the power-saving mode, it periodically shifts to the Doze state for power saving (S602). The Doze state is a state in which both transmission and reception of wireless communication are stopped. Since both transmission and reception are stopped, the STA cannot receive a radio packet such as an RTS packet or a CTS packet transmitted, in this state, by another peripheral communication apparatus to set the NAV value. After that, the STA resumes from the Doze state (S603) to enter a state in which both transmission and reception can be executed. Note that immediately after resuming from the Doze state, the STA may not be set with the NAV value which should be set by a radio packet transmitted from another communication apparatus before resuming from the Doze state. Therefore, the STA starts a timer to stand by for the NAVSyncDelay time period (S606).

If, for example, the AP detects the radio wave of a radar after the STA establishes the link with the AP the AP transmits a Channel Switch Announcement frame to change the channel in use in the link (S604). Then, the STA shifts to the channel designated by the Channel Switch Announcement frame (S605). Similar to the case in which the STA resumes from the Doze state, when shifting the channel, the STA cannot receive a radio packet such as an RTS packet or a CTS packet transmitted by another peripheral communication apparatus to set the NAV value before the completion of the shift operation. Therefore, to execute the same processing as that when the STA resumes from the Doze state, the STA starts a timer to stand by for the NAVSyncDelay time period (S606).

Assume that after the start of the timer, the STA generates data to be transmitted to the AP or another STA (S607). When the data to be transmitted is generated, the STA determines whether the timer started in step S606 has passed the NAVSyncDelay time period (S608). If the STA determines that the timer has passed the NAVSyncDelay time period (YES in step S608), the STA executes normal transmission processing. On the other hand, if the STA determines that the timer has not passed the NAVSyncDelay time period (NO in step S608), the STA executes the CCA with the decreased ED threshold (S609), similar to step S509. The subsequent processes are the same as those in step S510 and subsequent steps in FIGS. 5A and 5B.

Therefore, the STA in the state in which it cannot receive a signal in the frequency channel to be used due to the Doze state in the power-saving mode or the shift of the channel can improve the possibility of transmission of a signal while suppressing the possibility of interference with communication of another communication apparatus. Note that in this case as well, it is unnecessary to change additional hardware of the STA, and it is possible to obtain the effect by the above-described method without changing the AP.

Note that in the above description, an RTS packet is transmitted with low transmission power after the STA (Non-AP-MLD 103) determines that it is possible to transmit a signal by high sensitivity signal detection, by decreasing the ED threshold in the CCA, but the present invention is not limited to this. That is, after the STA performs the CCA using the normal ED threshold and determines that it is possible to transmit a signal, the STA may transmit an RTS packet with low transmission power. As described above, even if the RTS packet is transmitted, if the transmission power is sufficiently low, the influence on a data packet currently received in the AP is negligible. Note that by decreasing the ED threshold, no RTS packet is transmitted in response to detection of a signal. Thus, it is possible to suppress occurrence of an opportunity of exerting negligible influence.

According to the present invention, it is possible to perform high efficiency communication in consideration of interference.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-113137, filed Jul. 7, 2021, which is hereby incorporated by reference herein in its entirety.

What is claimed is:

1. A communication apparatus of a wireless LAN complying with the IEEE802.11 standard series, comprising:
   one or more processors; and
   one or more memories that store a program for causing, when executed by the one or more processors, the communication apparatus to:
   determine, by executing Clear Channel Assessment (CCA) for determining whether a signal from another communication apparatus is detected at a power level not lower than a predetermined threshold in a frequency channel to be used, whether a signal can be transmitted in the frequency channel;
   transmit a Request To Send (RTS) packet in response to determination that the signal can be transmitted in the frequency channel;
   transmit data to a communication partner apparatus in a case where a Clear To Send (CTS) packet is received from the communication partner apparatus in response to the RTS packet; and
   control to use, in a case where the RTS packet is transmitted during a pre determined period after the communication apparatus shifts from a first state in which a signal cannot be received in the frequency channel to a second state in which a signal can be received in the frequency channel, second transmission power lower than first transmission power used in a case where the RTS packet is transmitted during a period different from the predetermined period,
   wherein the communication apparatus can establish a plurality of links, and is configured not to perform reception in a second link different from a first link among the plurality of links while performing transmission in the first link among the plurality of links, and
   the communication apparatus is configured to operate in the first state in the second link while performing transmission in the first link, and shift to the second state in the second link in a case where the transmission in the first link is complete.

2. A communication method executed by a communication apparatus of a wireless LAN complying with the IEEE802.11 standard series, comprising:
   determining, by executing Clear Channel Assessment (CCA) for determining whether a signal from another communication apparatus is detected at a power level not lower than a predetermined threshold in a frequency channel to be used, whether a signal can be transmitted in the frequency channel;
   transmitting a Request To Send (RTS) packet in response to determination that the signal can be transmitted in the frequency channel;
   transmitting data to a communication partner apparatus in a case where a Clear To Send (CTS) packet is received from the communication partner apparatus in response to the RTS packet; and
   controlling to use, in a case where the RTS packet is transmitted during a predetermined period after the communication apparatus shifts from a first state in which a signal cannot be received in the frequency channel to a second state in which a signal can be received in the frequency channel, second transmission power lower than first transmission power used in a case where the RTS packet is transmitted during a period different from the predetermined period,
   wherein the communication apparatus can establish a plurality of links, and is configured not to perform reception in a second link different from a first link among the plurality of links while performing transmission in the first link among the plurality of links, and
   the communication method further comprises operating in the first state in the second link while performing transmission in the first link, and shifting to the second state in the second link in a case where the transmission in the first link is complete.

3. The method according to claim 2, wherein
in the controlling, the predetermined threshold of the CCA used by the communication apparatus during the predetermined period is controlled to be lower than the predetermined threshold of the CCA used during the period different from the predetermined period.

4. The method according to claim 2, wherein
the communication apparatus can operate in a power-saving mode,
the first state is a Doze state in the power-saving mode, and
the communication method comprises shifting to the second state in a case where the communication apparatus exists from the Doze state.

5. The method according to claim 2, wherein
the communication apparatus can change the frequency channel to be used,
the first state is a state before the frequency channel to be used is changed, and
the communication method comprises shifting to the second state in a case where the frequency channel to be used is changed.

6. The method according to claim 2, wherein
the second transmission power is determined based on received signal strength of the signal received from the communication partner apparatus and a target value of reception power of the RTS packet in the communication partner apparatus.

7. The method according to claim 6, wherein
the second transmission power is determined based further on transmission power of a signal in the communication partner apparatus.

8. The method according to claim 6, wherein
the target value is a value designated from the communication partner apparatus.

9. The method according to claim 6, wherein
the target value is a value specified based on a transmission rate of the RTS packet.

10. The method according to claim 2, wherein
the predetermined period is a NAVSyncDelay time period.

11. The method according to claim 2, wherein
the first transmission power is maximum transmission power.

12. The method according to claim 2, wherein
in a case where the CTS packet is not received from the communication partner apparatus and it is determined that a signal can be transmitted in the frequency channel after standing by for the predetermined period, data is transmitted to the communication partner apparatus.

13. A non-transitory computer-readable storage medium that stores a program for causing a communication apparatus of a wireless LAN complying with the IEEE802.11 standard series to:
  determine, by executing Clear Channel Assessment (CCA) for determining whether a signal from another communication apparatus is detected at a power level not lower than a predetermined threshold in a frequency channel to be used, whether a signal can be transmitted in the frequency channel;
  transmit a Request To Send (RTS) packet in response to determination that the signal can be transmitted in the frequency channel;
  transmit data to a communication partner apparatus in a case where a Clear To Send (CTS) packet is received from the communication partner apparatus in response to the RTS packet; and
  control to use, in a case where the RTS packet is transmitted during a predetermined period after the communication apparatus shifts from a first state in which a signal cannot be received in the frequency channel to a second state in which a signal can be received in the frequency channel, second transmission power lower than first transmission power used in a case where the RTS packet is transmitted during a period different from the predetermined period,
  wherein the communication apparatus can establish a plurality of links, and is configured not to perform reception in a second link different from a first link among the plurality of links while performing transmission in the first link among the plurality of links, and
  the communication apparatus is configured to operate in the first state in the second link while performing transmission in the first link, and shift to the second state in the second link in a case where the transmission in the first link is complete.

\* \* \* \* \*